(12) United States Patent
Chada et al.

(10) Patent No.: US 7,729,973 B2
(45) Date of Patent: Jun. 1, 2010

(54) SYSTEM AND METHOD FOR PROVIDING A TRUST ASSOCIATED WITH LONG POSITIONS IN INDEX FUTURES

(75) Inventors: Satyanarayan Reddy Chada, New York, NY (US); Donald A. MacLean, Long Island City, NY (US)

(73) Assignee: Merrill Lynch Co., Inc., New York, NY (US)

( * ) Notice: Subject to any disclaimer, the term of this patent is extended or adjusted under 35 U.S.C. 154(b) by 217 days.

(21) Appl. No.: 11/772,543

(22) Filed: Jul. 2, 2007

(65) Prior Publication Data
US 2009/0012891 A1    Jan. 8, 2009

(51) Int. Cl.
*G06Q 40/00* (2006.01)
(52) U.S. Cl. ............ 705/36 R; 705/35; 283/57; 283/58; 283/59; 707/202
(58) Field of Classification Search ........ 705/36 R; 283/57
See application file for complete search history.

(56) References Cited

U.S. PATENT DOCUMENTS

| | | | | |
|---|---|---|---|---|
| 6,088,685 | A | 7/2000 | Kiron et al. ............ | 705/36 |
| 6,321,212 | B1 | 11/2001 | Lange ............ | 705/37 |
| 7,283,978 | B2 * | 10/2007 | Frankel et al. ............ | 705/35 |
| 7,319,984 | B2 * | 1/2008 | Frankel et al. ............ | 705/35 |
| 7,433,839 | B2 * | 10/2008 | Bodurtha et al. ......... | 705/36 R |
| 2001/0025266 | A1 | 9/2001 | Gastineau et al. ......... | 705/36 |
| 2002/0026399 | A1 | 2/2002 | Narayan et al. ............ | 705/37 |
| 2002/0046154 | A1 * | 4/2002 | Pritchard ............ | 705/37 |
| 2002/0178102 | A1 | 11/2002 | Scheinberg et al. ......... | 705/37 |
| 2003/0144947 | A1 | 7/2003 | Payne ............ | 705/37 |

(Continued)

FOREIGN PATENT DOCUMENTS

| WO | WO 02/19204 A1 | 3/2002 |
|---|---|---|
| WO | WO 03/081503 A1 | 10/2003 |
| WO | WO 2004/006057 A2 | 1/2004 |

OTHER PUBLICATIONS

Disclosure Document Supplement (to disclosure document dated Jul. 1, 2002): *Commodity Trakrs*; 48 pages, May 27, 2003.
The GSCI Manual, *A Guide to the Goldman Sachs Commodity Index*, GSCI Manual—2005 Edition, 87 pages, Dec. 2004.

*Primary Examiner*—Kirsten S Apple
(74) *Attorney, Agent, or Firm*—Baker Botts L.L.P.

(57) ABSTRACT

A system comprises a memory operable to store market data. The system further comprises a processor communicatively coupled to the memory and operable to buy a plurality of index futures. The plurality of index futures are held as long positions in a trust, and a particular index future is publicly traded on a commodity exchange. The processor is further operable to issue a plurality of trust receipts associated with the trust, wherein the plurality of trust receipts are publicly traded on at least one security exchange. The processor is further operable to post a margin with a futures commission merchant (FCM), wherein the margin is based at least in part on the plurality of index futures and the FCM makes at least one interest payment associated with the plurality of index futures.

26 Claims, 5 Drawing Sheets

U.S. PATENT DOCUMENTS

| | | |
|---|---|---|
| 2003/0177077 A1 | 9/2003 | Norman ........................ 705/35 |
| 2003/0182219 A1 | 9/2003 | Bodurtha et al. ............... 705/36 |
| 2003/0229561 A1 | 12/2003 | Wallman ...................... 705/36 |
| 2003/0233302 A1 | 12/2003 | Weber et al. ................... 705/36 |
| 2004/0044609 A1 | 3/2004 | Moore ......................... 705/37 |
| 2004/0049448 A1 | 3/2004 | Glickman ..................... 705/37 |
| 2005/0283419 A1* | 12/2005 | Schaub ........................ 705/35 |
| 2006/0036533 A1* | 2/2006 | Frankel et al. ................. 705/37 |
| 2006/0059068 A1* | 3/2006 | Glinberg et al. ................ 705/35 |
| 2006/0282370 A1 | 12/2006 | Frankel et al. ................. 705/37 |

* cited by examiner

SYSTEM AND METHOD FOR PROVIDING A TRUST ASSOCIATED WITH LONG POSITIONS IN INDEX FUTURES

TECHNICAL FIELD OF THE INVENTION

The present invention relates generally to electronic investing and more specifically to a system and method for providing a trust associated with long positions in index futures.

BACKGROUND OF THE INVENTION

In traditional investing systems, non-institutional customers have sometimes avoided buying futures contracts. These non-institutional customers fear that they could incur losses in excess of their initial margin due to the leverage associated with traditional futures contracts.

SUMMARY OF THE INVENTION

In accordance with the present invention, the disadvantages and problems associated with prior investing systems have been substantially reduced or eliminated.

In some embodiments, a system comprises a memory operable to store market data. The system further comprises a processor communicatively coupled to the memory and operable to buy a plurality of index futures. The plurality of index futures are held as long positions in a trust, and a particular index future is publicly traded on a commodity exchange. The processor is further operable to issue a plurality of trust receipts associated with the trust, wherein the plurality of trust receipts are publicly traded on at least one security exchange. The processor is further operable to post a margin with a futures commission merchant (FCM), wherein the margin is based at least in part on the plurality of index futures and the FCM makes at least one interest payment associated with the plurality of index futures.

In other embodiments, a method comprises buying a plurality of index futures, wherein the plurality of index futures are held as long positions in a trust and a particular index future is publicly traded on a commodity exchange. The method continues by issuing a plurality of trust receipts associated with the trust, wherein the plurality of trust receipts are publicly traded on at least one security exchange. The method concludes by posting a margin with a futures commission merchant (FCM), wherein the margin is based at least in part on the plurality of index futures and the FCM makes at least one interest payment associated with the plurality of index futures.

In yet other embodiments, a trust comprises a plurality of index futures, wherein substantially all net assets of the trust are invested in long positions in index futures. A particular index future is publicly traded on a commodity exchange, and the particular index future represents a futures contract on a particular index. The trust issues a plurality of trust receipts that are publicly traded on at least one security exchange. The trust posts a margin with a futures commission merchant (FCM), and the margin is based at least in part on the plurality of index futures. The FCM makes periodic interest payments associated with the plurality of index futures to the commodity exchange.

The invention has several important technical advantages. Various embodiments of the invention may have none, some, or all of these advantages. One advantage is that the investing system allows non-institutional customers to post (as margin) 100% of the market value of the index futures at the time of purchase. As a result, long positions in index futures may not be leveraged for non-institutional customers in the investing system. Accordingly, non-institutional customers may not be subject to margin calls or requirements to make additional payments during the life of their long positions in the index futures.

Another advantage is that the investing system may comprise a trust that tracks the performance of a target index by investing the trust's net assets in long positions in index futures. The trust may issue trust receipts that may be traded on a public exchange. Thus, investing system may allow investors to buy and sell receipts that are associated with a trust that tracks the performance of a target index and that are traded through broker-dealers that may be unable to process non-traditional futures contracts. Another advantage is that the expenses of the trust may be paid through the functionality of platform fees embedded in the non-traditional futures contracts.

Other advantages of the present invention will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
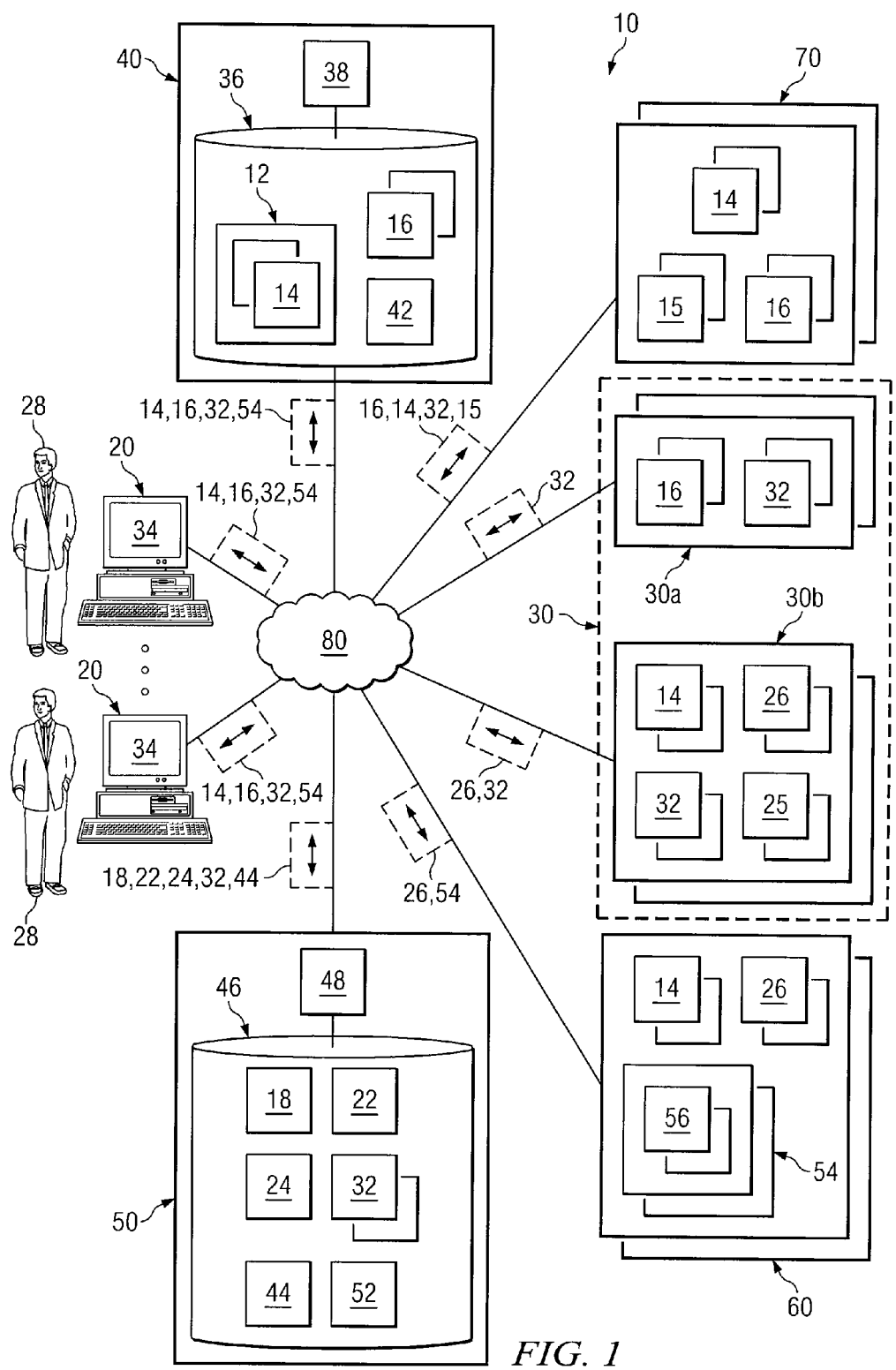
FIG. 1 illustrates an investing system, according to certain embodiments.

FIG. 1 illustrates an investing system 10, according to certain embodiments. Investing system 10 may comprise clients 20, exchanges 30, a trust server 40, an index server 50, futures commission merchants (FCMs) 60, and authorized participants 70 communicatively coupled by a network 80.

Investing system 10 is generally operable to maintain and operate a trust 12 that holds long positions in index futures 14. In some embodiments, trust 12 may issue trust receipts 16 that represent ownership interests in the net assets of trust 12. Trust receipts 16 associated with trust 12 may be traded on one or more exchanges 30. In some embodiments, trust receipts 16 may be publicly traded like securities on a security exchange 30a.

According to certain embodiments, index futures 14 represent futures contracts on a particular index, which may be referred to as target index 18. Index futures 14 may be configured to track the performance of target index 18. According to certain embodiments, target index 18 may represent one or more market indices 22 and/or financial indicators associated with securities, currencies, commodities, and/or any suitable type of investment instrument. In some embodiments, target index 18 may be and/or correspond to a total return index that represents the performance of a portfolio with notional exposure to both a market index 22 and an index of separately managed accounts (SMA index 24). The notional exposure to the component indices (i.e., market index 22 and SMA index 24) may be periodically rebalanced to maintain full exposure to each component index.

In some embodiments, investing system 10 may pass interest payments 26 from entities that hold long positions in index futures 14 to entities that hold short positions in index futures 14. This feature of investing system 10 may be referred to as "interest rate pass-through" (IRPT). In some embodiments, the IRPT feature of investing system 10 may allow index futures 14 to trade more closely with target index 18 than might be the case with traditional futures contracts. Investing system 10 is further operable to deduct platform fees 25 from IRPT payments 26. By deducting platform fees 25 from IRPT payments 26, investing system 10 may satisfy the expenses of trust 12 and fund alternative distribution channels such as, for example, trust receipts 16.

As explained above, investing system 10 may comprise one or more clients 20. Client 20 represents any suitable local or remote end-user device that may be used by investors 28 to access one or more elements of investing system 10, such as exchanges 30. In some embodiments, investor 28 may use client 20 to view information regarding target index 18, to submit trading orders to exchanges 30, to receive market data 32, to buy or sell trust receipts 16, to monitor the status of trust 12, to receive trade confirmations, and/or to communicate with various components of investing system 10. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of investing system 10. Client 20 may also comprise any suitable user interface such as a display, microphone, keyboard, or any other appropriate terminal equipment according to particular configurations and arrangements. It will be understood that investing system 10 may comprise any number and combination of clients 20.

Clients 20 may be used by investors 28. The term "investor" is meant to broadly apply to any user of investing system 10, whether that user is an individual, machine, money manager, agent, financial professional, legal entity, or any suitable user that is capable of buying, selling, and/or holding investment instruments in investing system 10. In some embodiments, investors 28 may be broker-dealers who are not authorized participants 70.

In some embodiments, client 20 may comprise a graphical user interface (GUI) 34. GUI 34 is generally operable to tailor and filter data presented to investor 28. GUI 34 may provide investor 28 with an efficient and user-friendly presentation of information regarding index futures 14, indices, trust 12, trading orders, market data 32, and/or other suitable information. GUI 34 may comprise a plurality of displays having interactive fields, pull-down lists, and buttons operated by investor 28. In one example, GUI 34 presents relevant market data 32 to investor 28 and conceals the remaining information to reduce visual clutter. Then, upon receiving a request from investor 28, GUI 34 expands the visual representation of market data 32 to display account information, market information, and/or other suitable information. GUI 34 may include multiple levels of abstraction including groupings and boundaries. It should be understood that the term graphical user interface may be used in the singular or in the plural to describe one or more graphical user interfaces and each of the displays of a particular graphical user interface.

Investors 28 may use clients 20 to communicate with exchanges 30. Exchange 30 is generally operable to receive and execute trading orders from investors 28. Once a particular trading order is executed, exchange 30 is operable to generate and transmit a trade confirmation message to client 20. Exchange 30 is further operable to transmit market data 32 to clients 20, index server 50, and/or other components of investing system 10. Market data 32 may comprise information regarding trading activities in exchange 30. In some embodiments, market data 32 may comprise information regarding best bid prices, best offer prices, trading volumes, volatility, and/or any other suitable information regarding trading activity in exchange 30. According to certain embodiments, market data 32 comprises current and/or historical information regarding any suitable index, financial instrument, mutual fund, hedge fund, exchange traded fund ("ETF"), investment instrument, and/or any suitable number and combination of indicators regarding investing system 10.

Exchanges 30 comprise all manner of order execution venues including market centers, Electronic Communication Networks (ECNs), Alternative Trading Systems (ATSs), and/or any other suitable market participants. Each exchange 30 may maintain a bid and offer price for at least one investment instrument by standing ready, willing, and able to buy or sell that investment instrument at publicly quoted prices, also referred to as exchange prices. Different exchanges 30 may provide different prices for particular investment instruments. For example, a particular exchange 30 may offer a particular bid price and/or offer price for a particular investment instrument, while another exchange 30 may offer a different bid price and/or offer price for the same investment instrument.

In some embodiments, exchanges 30 comprise one or more security exchanges 30a and one or more commodity exchanges 30b. In some embodiments, security exchange 30a represents an organization, venue, system, and/or market center in which securities, trust receipts 16, and/or other suitable investment instruments are traded among investors 28. Security exchange 30a may facilitate the issuance and redemption of securities and the payment of income and dividends. Examples of security exchange 30a include, but are not limited to, the New York Stock Exchange, the Hong Kong Stock Exchange, the Dublin Stock Exchange, the London Stock Exchange, the Luxembourg Stock Exchange, and the Frankfurt Stock Exchange.

Commodity exchange 30b represents an exchange 30 where commodities and derivative instruments are traded. In particular, commodity exchange 30b may facilitate the trading of agricultural products, oil products, metals, environmental instruments, and/or other suitable commodities. Commodity exchange 30b may facilitate the trading of contracts associated with commodities such as, for example, forwards, futures, options, spot prices, swaps, and/or any suitable derivative instrument. In some embodiments, commodity exchange 30b may facilitate the trading of index futures 14, interest rates, and/or any suitable derivative instrument. Examples of commodity exchange 30b include, but are not limited to, the New York Mercantile Exchange, the Chicago Mercantile Exchange, the London Metals Exchange, and the Tokyo Commodity Exchange.

Clients 20 and exchanges 30 may be communicatively coupled to trust server 40 via network 80. Trust server 40 is generally operable to manage trust 12 associated with index futures 14. Index futures 14 refer to futures contracts on target index 18. Accordingly, trust 12 may be configured to track the performance of target index 18. In some embodiments, to track the performance of target index 18, trust 12 may invest all or substantially all of its assets in long positions in index futures 14 that are associated with target index 18. In market terminology, a trader who purchases a futures contract is "long" in the market, while a trader who sells a futures contract is "short" in the market. In holding long positions in index futures 14, trust 12 seeks investment results that track the performance of target index 18, less expenses and liabilities of trust 12, if any.

According to certain embodiments, trust 12 may be considered a commodity pool under the Commodity Exchange Act and/or the applicable regulations of the Commodity Futures Trading Commission. In some embodiments, trust 12 may be established and operated as a grantor trust.

In some embodiments, target index 18 represents a measure of the market value and/or performance of one or more investment instruments such as, for example, equities, debt, currencies, commodities, stocks, bonds, futures contracts, derivatives, and/or any suitable trading product. In some embodiments, target index 18 may be any suitable market index 22 such as, for example, a commodities index, an equity index, a currency index, a bond index, and/or any suitable index. Target index 18 may represent a single market index 22 or a combination of multiple market indices 22.

In some embodiments, target index 18 may be and/or correspond to a total return index that represents the performance of a portfolio with notional exposure to both a particular market index 22 and a particular SMA index 24. The notional exposure to the component indices (i.e., market index 22 and SMA index 24) may be periodically rebalanced to maintain full exposure to each component index. In other embodiments, target index 18 may be rebalanced to maintain partial exposure to market index 22 and/or SMA index 24. In certain embodiments, target index 18 may not be rebalanced. According to certain embodiments, because all or substantially all of the assets of trust 12 are invested in long positions in index futures 14 associated with target index 18, the performance of trust 12 may track the performance of target index 18.

According to certain embodiments, target index 18 may be the PIMCO CommodityRealReturn DJ-AIGCI TRAKRS Index. In such embodiments, index futures 14 associated with target index 18 may be PIMCO CommodityRealReturn DJ-AIGCI TRACKRS.

In some embodiments, trust 12 may issue trust receipts 16. Trust receipt 16 may refer to a share that represents a fractional undivided beneficial interest and ownership of the net assets of trust 12. Trust receipts 16 associated with trust 12 may be traded on public exchange 30 by investors 28 and/or authorized participants 70.

According to certain embodiments, trust server 40 may be operated and/or maintained by a trustee and/or sponsor of trust 12. Trust server 40 may store a trust profile that comprises the current value of trust 12 and/or information regarding index futures 14 held by trust 12. In some embodiments, trust server 40 is operable to receive, from authorized participants 70 and/or investors 28, orders for trust receipts 16 associated with trust 12. In response, trust server 40 may generate trust receipts 16 based at least in part on the value of the net assets of trust 12. In particular, trust server 40 may determine a current price for each trust receipt 16 based at least in part on market data 32 and index futures 14 held by trust 12. In some embodiments, trust server 40 may transmit trust receipts 16 to investors 28, exchanges 30, and/or authorized participants 70. In return for trust receipts 16, trust server 40 may receive from counterparties long positions in index futures 14, cash 15, a combination of index futures 14 and cash 15, and/or other suitable consideration.

Trust server 40 may comprise any suitable combination of hardware and/or software implemented in one or more modules to provide the described functions and operations. In some embodiments, trust server 40 may comprise a general-purpose personal computer (PC), a Macintosh, a workstation, a Unix-based computer, a server computer, or any suitable processing device. In some embodiments, the functions and operations described above may be performed by a pool of multiple trust servers 40. A particular trust server 40 may comprise a trust memory 36 and a trust processor 38.

Trust memory 36 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 32. Although FIG. 1 illustrates trust memory 36 as internal to trust server 40, it should be understood that trust memory 36 may be internal or external to trust server 40, depending on particular implementations. Also, trust memory 36 may be separate from or integral to other memory devices to achieve any suitable arrangement of memory devices for use in investing system 10.

Trust memory 36 is generally operable to store index futures 14 and trust logic 42. Trust logic 42 generally comprises rules, algorithms, code, tables, and/or other suitable instructions for performing the described functions and operations.

Trust memory 36 is communicatively coupled to trust processor 38. Trust processor 38 is generally operable to execute trust logic 42 stored in trust memory 36 to determine the net asset value of trust 12, to process orders for trust receipts 16, and to generate and transmit trust receipts 16 to exchanges 30, investors 28, and/or authorized participants 70. Trust processor 38 may comprise any suitable combination of hardware and software implemented in one or more modules to provide the described function or operation.

Trust server 40 may be communicatively coupled to authorized participants 70 via network 80. Authorized participant 70 represents an agent or intermediary that facilitates the buying and selling of trust receipts 16 and/or other suitable investment instruments. In some embodiments, authorized participants 70 may be authorized to purchase trust receipts 16 in bulk quantities from trust 12 and to sell individual trust receipts 16 to investors 28 in one or more security exchanges 30a. In some embodiments, to qualify as an authorized participant 70 in investing system 10, an individual or organization may be required to register as a Depository Trust Company participant ("DTC Participant").

Investing system 10 may further comprise one or more FCMs 60. FCM 60 represents an individual or organization that may accept orders to buy or sell futures or futures options and that may hold money or investment instruments of investors 28 in margin accounts 54 in accordance with the rules of one or more exchanges 30. FCM 60 may maintain records of the positions, margin deposits, money balances, and completed transactions of one or more investors 28. In some embodiments, FCM 60 may hold index futures 14 on behalf of the beneficial owner (e.g., investor 28, trust 12, etc.) of index futures 14. In return for providing these services, FCM 60 may collect commissions and/or fees. In some embodiments, an individual or organization may be certified as an FCM 60 by the Commodities and Futures Trading Commission.

FCMs 60 and authorized participants 70 may be communicatively coupled to index server 50 via network 80. Index server 50 is generally operable to determine the current value of target index 18 associated with index futures 14. In some embodiments, index server 50 may determine the current value of target index 18 based at least in part on market data 32 from exchanges 30. In other embodiments, index server 50 may determine the current value of target index 18 based at least in part on a master index 44 that represents the performance of full notional exposure to the total return of market index 22 and SMA index 24. Index server 50 may transmit the determined values of target index 18, master index 44, SMA index 24, and/or market index 22 to clients 20 and/or other components of investing system 10.

Index server 50 may comprise any suitable combination of hardware and/or software implemented in one or more modules to provide the described functions and operations. In some embodiments, index server 50 may comprise a general-purpose personal computer (PC), a Macintosh, a workstation, a Unix-based computer, a server computer, or any suitable processing device. In some embodiments, the functions and operations described above may be performed by a pool of multiple index servers 50. A particular index server 50 may comprise an index memory 46 and an index processor 48.

Index memory 46 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 32. Although FIG. 1 illustrates index memory 46 as internal to index server 50, it should be understood that index memory 46 may be internal or external to index server 50, depending on particular implementations. Also, index memory 46 may be separate from or integral to other memory devices to achieve any suitable arrangement of memory devices for use in investing system 10.

Index memory 46 is generally operable to store market data 32 and current and/or historic values of target index 18, master index 44, market index 22, and/or SMA index 24. Index memory 46 is further operable to store index logic 52. Index logic 52 generally comprises rules, algorithms, code, tables, and/or other suitable instructions for performing the described functions and operations.

Index memory 46 is communicatively coupled to index processor 48. Index processor 48 may comprise any suitable combination of hardware and software implemented in one or more modules to execute index logic 52 and to provide the described function or operation.

As explained above, clients 20, exchanges 30, trust server 40, index server 50, FCMs 60, and authorized participants 70 may be communicatively coupled via one or more networks 80. Network 80 may represent any number and combination of wireline and/or wireless networks suitable for data transmission. Network 80 may, for example, communicate internet protocol packets, frame relay frames, asynchronous transfer mode cells, and/or other suitable information between network addresses. Network 80 may include one or more intranets, local area networks, metropolitan area networks, wide area networks, cellular networks, all or a portion of the Internet, and/or any other communication system or systems at one or more locations.

It should be understood that the internal structure of investing system 10 and the servers, processors, and memory devices associated therewith is malleable and can be readily changed, modified, rearranged, or reconfigured to achieve the intended operations of investing system 10.

In operation, investing system 10 is operable to manage a particular trust 12 that holds long positions in index futures 14 associated with target index 18. In some embodiments, index futures 14 may be available from commodity exchange 30b. Trust server 40 may command FCM 60 associated with trust 12 to establish long positions in one or more index futures 14. In response, FCM 60 may buy and hold on behalf of trust 12 one or more index futures 14. Trust server 40 may record the purchased index futures 14 in trust memory 36. In some embodiments, as trust server 40 uses commodity exchange 30b to establish long positions in index futures 14, other investors 28 may use commodity exchange 30b to establish short positions in index futures 14.

According to certain embodiments, investing system 10 may require trust 12 to post a margin 56 for the purchased index futures 14. Margin 56 may refer to cash 15, short-term debt, securities, and/or other suitable investment instruments deposited with FCM 60 or other suitable entity as a provision against loss on transactions. In some embodiments, investing system 10 may require trust 12 to post as margin 56 an amount equal to 100% of the value of the purchased index futures 14. To post the appropriate margin 56, trust server 40 may deposit cash 15, short-term debt, securities, and/or other suitable investment instruments in a margin account 54 maintained by FCM 60.

According to certain embodiments, trust server 40 may configure trust 12 such that all or substantially all of the assets of trust 12 are invested in long positions in index futures 14. In conjunction with buying index futures 14 on behalf of trust 12, trust server 40 may generate a plurality of trust receipts 16. Each trust receipt 16 may represent a fractional undivided beneficial interest in and ownership of the net assets of trust 12. In some embodiments, trust server 40 may list the generated trust receipts 16 on one or more exchanges 30. In particular, trust server 40 may list the generated trust receipts 16 on a security exchange 30a such as, for example, the New York Stock Exchange. Investors 28 may buy, sell, and trade trust receipts 16 listed on exchange 30.

In some embodiments, index futures 14 may be associated with target index 18. In some embodiments, investing system 10 may require FCMs 60 associated with investors 28 that hold long positions in index futures 14 to periodically (e.g., daily, weekly, etc.) make interest payments 26 to commodity exchange 30b. Commodity exchange 30b may make period interest payments 26 to FCMs 60 associated with investors 28 that hold short positions in index futures 14. This feature of periodically passing interest payments 26 between FCMs 60 may be referred to as interest rate pass-through (IRPT). Interest payments 26 that are passed between FCMs 60 according to this feature may be referred to as IRPT payments 26.

In some embodiments, investing system 10 is operable to deduct platform fees 25 from IRPT payments 26. Platform fees 25 may include, but are not limited to, licensing fees payable to index providers, estimated or actual custodial fees related to SMAs 64, listing and/or development fees payable to commodity exchange 30b and/or the developer(s) of index futures 14, costs pertaining to alternative distribution channels, and/or any suitable costs and/or fees. Investing system 10 may determine platform fees 25 as a predetermined percentage of IRPT payments 26. In some embodiments, commodity exchange 30b is operable to determine and deduct platform fees 25 from IRPT payments 26 received from FCMs 60. In other embodiments, FCMs 60 may determine and deduct platform fees 25 prior to sending IRPT payments 26 to commodity exchange 30b. By deducting platform fees 25 from IRPT payments 26, investing system 10 may satisfy the expenses of trust 12 and/or fund alternative distribution channels such as, for example, trust receipts 16.

Figure 2:
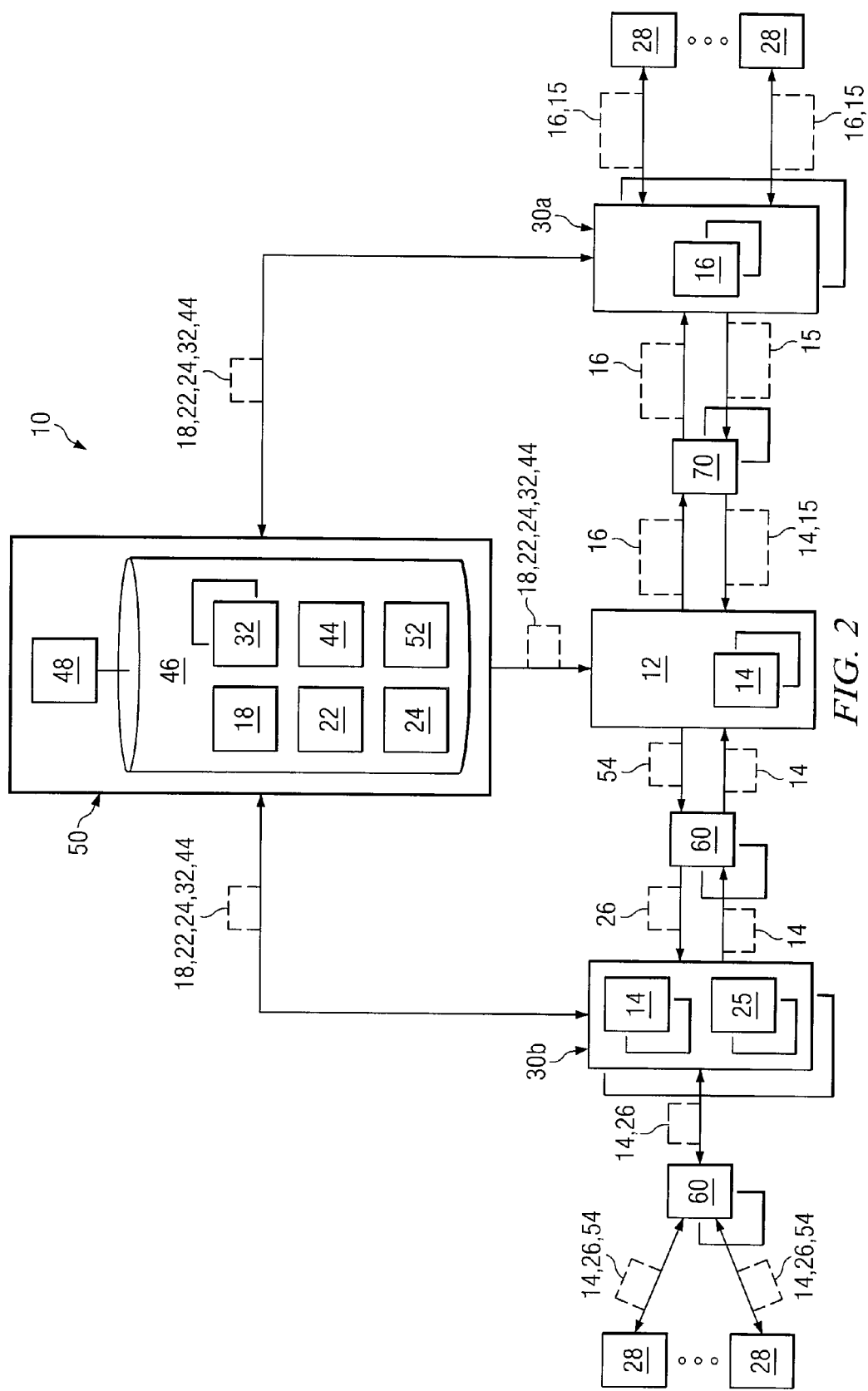
FIG. 2 illustrates a flow of operation for managing a trust in the investing system, according to certain embodiments.

FIG. 2 illustrates a flow of operation for managing trust 12 in investing system 10, according to certain embodiments. Commodity exchange 30b is operable to list index futures 14 associated with target index 18. The performance of index futures 14 generally tracks the performance of target index 18. In some embodiments, target index 18 is equal to master index 44 minus fees and expenses such as, for example, license and/or development fees associated with various aspects of index futures 14. Master index 44 may be a total return index that represents the performance of a portfolio with notional exposure to both market index 22 and SMA index 24. In some embodiments, the respective values of target index 18, master index 44, market index 22, and/or SMA index 24 may be determined by index server 50 based at least in part on market data 32 from commodity exchange 30b, security exchange 30a, over-the-counter pricing mechanisms, financial news services (e.g., Bloomberg L. P.), and/or any suitable data source. Index server 50 may transmit to trust server 40 the determined values of target index 18, master index 44, market index 22, and/or SMA index 24.

In some embodiments, investors 28 may sell (short) index futures 14 on commodity exchange 30b. Investors 28 that sell index futures 14 on commodity exchange 30b may be associated with one or more FCMs 60. The particular FCMs 60 associated with investors 28 that sell index futures 14 may be referred to as short-side FCMs 60. As explained above, trust 12 and/or other investors 28 may buy (long) index futures 14 on commodity exchange 30b. Trust 12 and investors 28 that buy index futures 14 on commodity exchange 30b may be associated with one or more FCMs 60. The particular FCMs 60 associated with parties that establish long positions in index-futures may be referred to as long-side FCMs 60.

In some embodiments, trust server 40 associated with trust 12 may be configured to invest all or substantially all of the net assets of trust 12 in long positions in index futures 14. In conjunction with buying index futures 14, trust 12 may be required to post margin 56 with the long-side FCM 60. In some embodiments, trust 12 may be required, at the time of purchase, to post 100% of the market value of index futures 14 as margin 56. In conjunction with buying index futures 14 on commodity exchange 30b, trust server 40 may record in memory the current number and value of index futures 14 held by trust 12.

According to certain embodiments, trust server 40 is operable to generate trust receipts 16 associated with trust 12. Each trust receipt 16 may represent a fractional undivided beneficial interest in and ownership of the net assets of trust 12. In some embodiments, trust server 40 may sell the generated trust receipts 16 to authorized participants 70 and/or investors 28.

According to certain embodiments, authorized participant 70 represents an individual or organization that serves as an intermediary between trust 12 and security exchange 30a. In some embodiments, trust 12 may transfer trust receipts 16 to authorized participant 70 in bulk quantities via the Depository Trust Company. In some embodiments, trust 12 may transfer trust receipts 16 to authorized participant 70 in bundles of 50,000 trust receipts 16. In other embodiments, trust 12 may transfer trust receipts 16 to authorized participant 70 in bundles of 10,000 trust receipts 16, 100,000 trust receipts 16, and/or any suitable quantity. According to certain embodiments, the quantity of trust receipts 16 in a bundle may vary based at least in part on the type(s) of consideration provided by authorized participant 70. In exchange for the bundles of trust receipts 16, authorized participant 70 may transfer to trust 12 (long) index futures 14, cash 15, a combination of cash 15 and index futures 14, and/or any suitable consideration.

In some embodiments, trust server 40 may store a configurable limit associated with the number of bundles of trust receipts 16 that authorized participant 70 may buy in exchange for cash 15. For example, trust server 40 may store a configurable limit that a particular authorized participant 70 may not buy less than two bundles of trust receipts 16 in exchange for cash 15. Accordingly, trust server 40 may allow authorized participant 70 to buy less than two bundles of trust receipts 16 in exchange for index futures 14 but may prevent authorized participant 70 from buying less than two bundles of trust receipts 16 in exchange for cash 15. Although the foregoing example illustrates a configurable limit of two bundles, it should be understood that the configurable limit may be any suitable number.

In conjunction with buying bundles of trust receipts 16 from trust 12, authorized participant 70 may sell one or more trust receipts 16 on security exchange 30a to investors 28. In some embodiments, trust receipts 16 may be exchanged for cash 15, index futures 14, and/or any suitable consideration. Thus, investors 28, authorized participants 70, and/or trust 12 may trade trust receipts 16 associated with trust 12 on a public security exchange 30a. In some embodiments, investing system 10 may cause FCMs 60 associated with investors 28 that hold long positions in index futures 14 to periodically (e.g., daily, weekly, etc.) make IRPT payments 26 to commodity exchange 30b, which may make periodic IRPT payments 26 to FCMs 60 associated with investors 28 that hold short positions in index futures 14.

According to certain embodiments, trust 12 may be configured as a fixed investment trust 12 or as a variable investment trust 12. In certain embodiments where trust 12 is structured as a fixed investment trust 12, the composition of the portfolio of trust 12, per trust receipt 16, may remain unchanged. In certain embodiments where trust 12 is structured as a variable investment trust 12, the composition of the portfolio of trust 12, per trust receipt 16, may be permitted to change.

In some embodiments, trust 12 may hold more than one type of futures contract. For example, half of the net assets of trust 12 may be invested in a first type of futures contract and half of the net assets of trust 12 may be invested in a second type of futures contract. In this example, trust receipt 16 associated with trust 12 may represent a pro rata ownership interest in both the first type and the second type of futures contract held by trust 12. Although the foregoing example describes a trust 12 that holds two types of futures contracts, it should be understood that trust 12 may hold any number and combination of different types of futures contracts. It should be understood that the different types of futures contracts may be held by trust 12 according to any suitable proportions.

Figure 3:
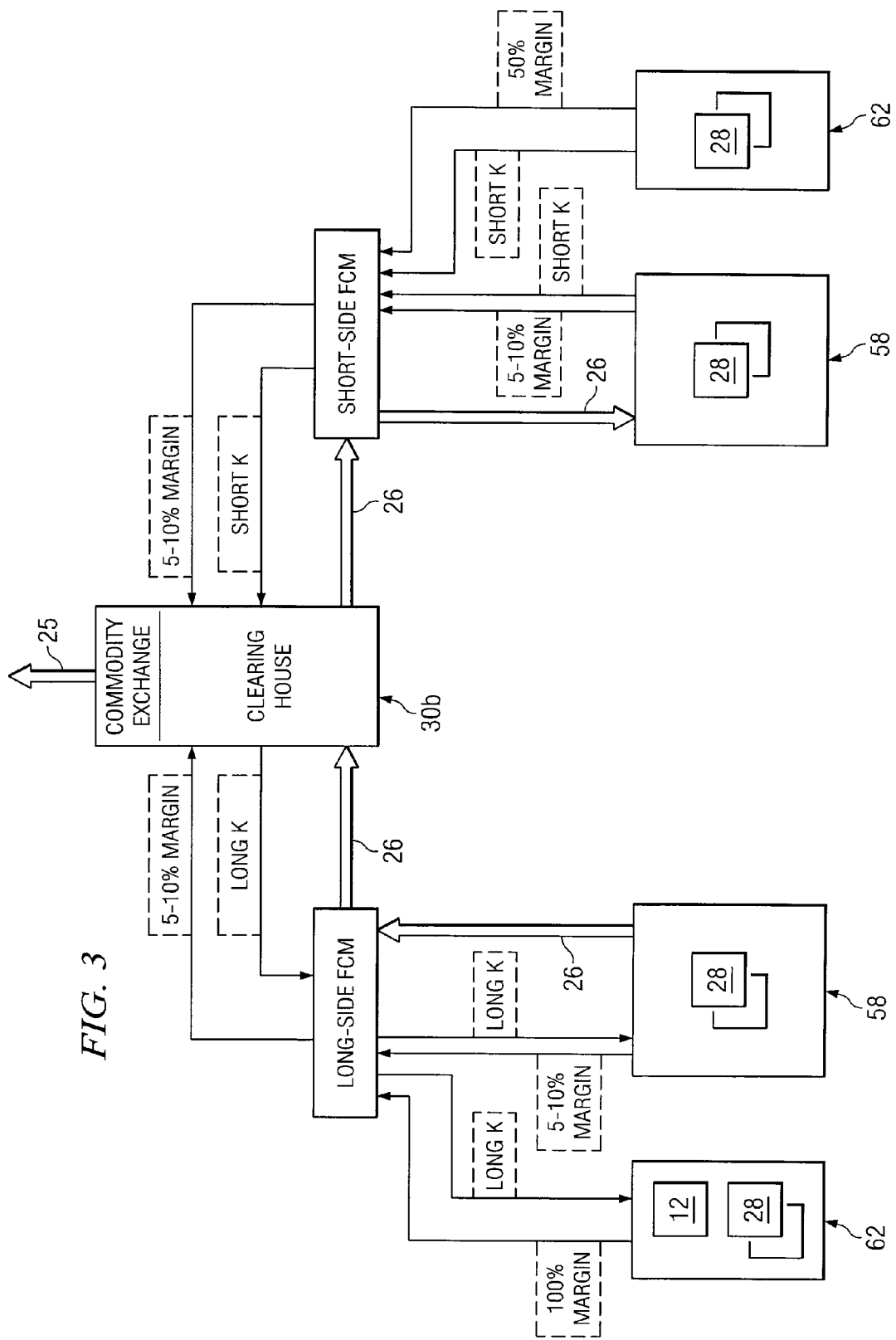
FIG. 3 illustrates a flow of operation for the interest rate pass-through feature of the investing system, according to certain embodiments.

FIG. 3 illustrates a flow of operation for the interest rate pass-through (IRPT) feature of investing system 10, according to certain embodiments. The parties in investing system 10 may be classified as institutional customers 58 or non-institutional customers 62. In some embodiments, institutional customer 58 may be (1) a "qualified institutional buyer" (QIB) as defined in Rule 144A under the Securities Act of 1933 or (2) exchange members registered with a regulatory commission as a floor broker or floor trader. In some embodiments, a corporation may be considered an institutional customer 58 if the corporation in the aggregate owns and invests on a discretionary basis at least $100 million in securities of issuers that are not affiliated with the purchaser. According to certain embodiments, institutional customer 58 may be a pension fund, insurance company, bank, or other qualifying individual or organization.

Non-institutional customer 62 may be an individual or organization that does not qualify as an institutional customer 58. In some embodiments, trust 12 may be considered a non-institutional customer 62. Various investors 28, authorized participants 70, and FCMs 60 may qualify as institutional customers 58 while other investors 28 and authorized participants 70 may qualify as non-institutional customers 62.

In some embodiments, institutional customer 58 may elect to be treated as a non-institutional customer 62 for purposes of buying and/or selling index futures 14 in investing system 10. Such an institutional customer 58 may be referred to as an electing institutional customer 58.

In some embodiments, institutional customers 58 may be subject to different margin requirements than non-institutional customers 62. For example, institutional customer 58 on the long or short side of a transaction for index futures 14 may be subject to a margin requirement of 5%-10% of the purchase price of the transacted index futures 14. Non-institutional customer 62 on the long side of a transaction for index futures 14 may be subject to a margin requirement of 100% of the purchase price of the transacted index futures 14. A non-institutional customer 62 on the short side of a transaction for index futures 14 may be subject to a margin requirement of 50% of the purchase price of the transacted index futures 14.

According to the foregoing example, institutional customer 58, having posted a smaller initial margin amount, is subject to daily variation margin account requirements as the value of index future 14 changes over time. Non-institutional customer 62 on the long side, however, is free from these daily variation margin account requirements. It should be understood that the margin requirement for an institutional customer 58 on the long side may be the same as or different from the margin requirement for an institutional customer 62 on the short side.

In some embodiments, exchange 30 and/or FCMs 60 determine one or more daily settlement prices associated with index futures 14. In conjunction with the determination of the daily settlement price, each long-side FCM 60 pays to commodity exchange 30b daily IRPT payments 26. Commodity exchange 30b passes the received IRPT payments 26 to short-side FCMs 60. In some embodiments, commodity exchange 30b determines the amount of a particular IRPT payment 26 based at least in part on a daily rate of interest as well as the number of positions multiplied by the settlement value of index futures 14. In some embodiments, the daily rate of interest may correspond to the Federal Funds Effective Rate. For example, the daily rate of interest may be the Federal Funds Effective Rate minus 1.00%. In some embodiments, commodity exchange 30b comprises a clearing house that determines, receives, allocates, and routes IRPT payments 26.

According to certain embodiments, commodity exchange 30b may receive daily IRPT payments 26 from (1) FCMs 60 holding long positions on behalf of non-institutional customers 62 and "electing institutional customers" 58 and (2) institutional customers 58 holding long positions. Commodity exchange 30b may make daily IRPT payments 26 to (1) FCMs 60 holding short positions on behalf of non-institutional customers 62 and electing institutional customers 58 and (2) institutional customers 58 holding short positions. The value of IRPT payments 26 transmitted from long-side FCMs 60 to commodity exchange 30b may be different from the value of IRPT payments 26 transmitted from commodity exchange 30b to short-side FCMs 60.

Because trust 12 may be a non-institutional customer 62 holding long positions in index futures 14, investing system 10 may not require trust 12 to make IRPT payments 26. The reason is that, as a non-institutional customer 62, trust 12 may have posted (with long-side FCM 60) 100% of the purchase price of index futures 14 held by trust 12. Accordingly, long-side FCM 60 associated with trust 12 may be responsible for making daily IRPT payments 26.

In some embodiments, a non-institutional customer 62 that holds long positions in index futures 14 would not be assessed an IRPT payment 26 because the non-institutional customer 62 already posted with long-side FCM 60 100% of the purchase price of the transacted index futures 14. An institutional customer may be assessed an IRPT payment 26 because the institutional customer may have posted 5%-10% of the purchase price of the transacted index futures 14. Similarly, non-institutional customers 62 holding short positions may not receive IRPT payments 26, but institutional customers 58 holding short positions may receive IRPT payments 26.

Investing system 10 may deduct platform fees 25 from IRPT payments 26. Platform fees 25 may include, but are not limited to, licensing fees payable to index providers, estimated or actual custodial fees related to SMAs 64, listing and/or development fees payable to commodity exchange 30b and/or the developer(s) of index futures 14, costs pertaining to alternative distribution channels, and/or any suitable costs and/or fees. Investing system 10 may determine platform fees 25 as a predetermined percentage of IRPT payments 26. In some embodiments, commodity exchange 30b is operable to determine and deduct platform fees 25 from IRPT payments 26 received from FCMs 60. In other embodiments, FCMs 60 may determine and deduct platform fees 25 prior to sending IRPT payments 26 to commodity exchange 30b. By deducting platform fees 25 from IRPT payments 26, investing system 10 may satisfy the expenses of trust 12 and/or fund alternative distribution channels such as, for example, trust receipts 16.

In operation, a particular non-institutional customer 62 may buy (long) index futures 14 and post with long-side FCM 60 a margin 56 of 100% of the purchase price of the received index futures 14. A particular institutional customer may buy (long) index futures 14 and post with long-side FCM 60 a margin 56 of 5%-10% of the purchase price of the received index futures 14. The long-side FCM 60 may post with commodity exchange 30b (e.g., via a clearing house associated with commodity exchange 30b) a margin 56 of 5%-10% of the purchase price of index futures 14 received by the long-side FCM 60.

The clearing house associated with exchange 30 may determine an IRPT payment 26 based at least in part on the number of positions and the settlement value of index futures 14. The long-side FCM 60 may then pay the determined IRPT payment 26 to the clearing house associated with commodity exchange 30b. The clearing house and/or commodity exchange 30b may then determine and deduct platform fees 25 from the IRPT payments 26 received from the long-side FCM(s) 60. The clearing house may then transmit IRPT payment 26 to one or more short-side FCMs 60. The one or more short-side FCMs 60 may transmit at least a portion of the received IRPT payment 26 to institutional customers 58 holding short positions in index futures 14.

Although the foregoing example illustrates particular percentages for the margin requirements of institutional and non-institutional customers 62, it should be understood that any suitable number and combination of margin percentages may be used.

Figure 4:
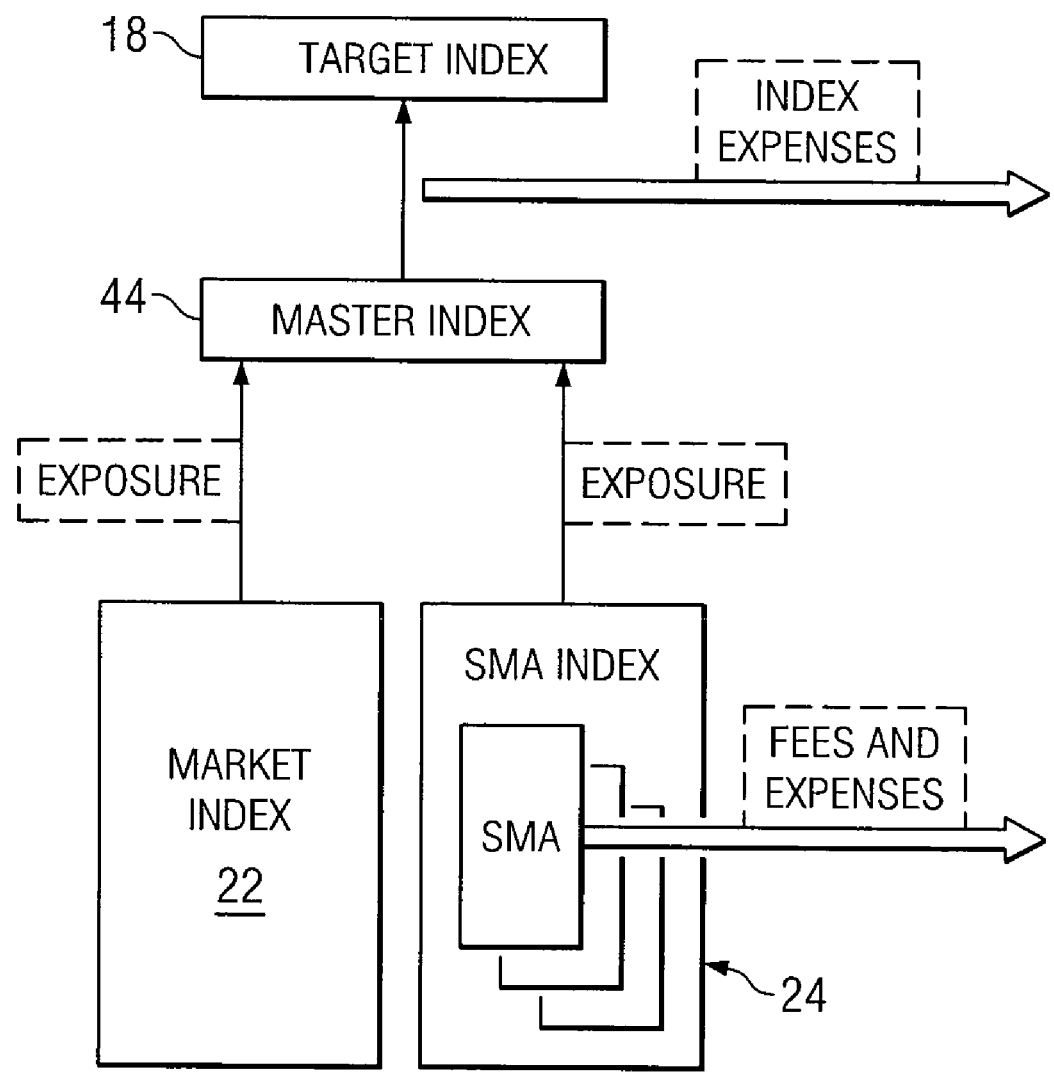
FIG. 4 illustrates an example structure of a target index associated with index futures, according to certain embodiments.

FIG. 4 illustrates an example structure of target index 18 associated with index futures 14, according to certain embodiments. In some embodiments, index futures 14 held by trust 12 represent futures contracts on target index 18. According to certain embodiments, index futures 14 are configured to track the performance of target index 18. Target index 18 may be predicated on master index 44, which may be predicated on market index 22 and SMA index 24. Index server 50 is operable to determine the current values of SMA index 24, market index 22, master index 44, and/or target index 18.

According to certain embodiments, SMA index 24 is a measure of the performance of a plurality of separately managed accounts (SMAs) 64. The term "separately managed account" refers to an account of investment instruments that are managed by a financial professional on behalf of an account owner. A SMA 64 may be distinguished from a mutual fund in that an investor 28 in a mutual fund does not own the investment instruments that underlie the mutual fund. In contrast, an owner of a particular SMA 64 owns the investment instruments that underlie the particular SMA 64. Because the owner of SMA 64 actually owns the investment instruments that underlie SMA 64, the owner may have more control over which investment instruments are held in SMA 64. Thus, in some embodiments, SMA 64 provides owner with a greater opportunity for customization than a mutual fund.

In some embodiments, index server 50 may periodically determine the value of each SMA 64 associated with SMA index 24. The value of SMA 64 may be determined by calculating the total value of investment instruments in SMA 64, less liabilities attributable to SMA 64 and after deduction of the management fees. According to certain embodiments, index server 50 is operable to value each SMA 64 as of the close of trading on each business day.

Index server 50 may determine the value of SMA index 24 based at least in part on the respective value of each SMA 64 associated with SMA index 24. Index server 50 may determine the value of SMA index 24 as the weighted average of the values of each SMA 64 that is associated with SMA index 24. In some embodiments, index server 50 may determine the value of SMA index 24 according to the following formula, which may be stored in index memory 46:

$$\text{SMA index 24} = \frac{\sum_{i=1}^{n} \text{SMA Account Value}_i * \text{SMA Weight}_i}{\sum_{i=1}^{n} \text{SMA Weight}_i}$$

In the foregoing formula, SMA Account Value refers to the current value of a respective SMA 64 and SMA Weight refers to a weight associated with the respective SMA 64. Thus, SMA index 24 may represent a weighted average of each SMA 64 that is associated with SMA index 24.

According to certain embodiments, index server 50 is further operable to periodically (e.g., daily, weekly, monthly, etc.) determine the current value of market index 22. Market index 22 is a measure of the market value and/or performance of the particular investment instruments that underlie market index 22. Market index 22 may be predicated on any suitable investment instruments such as, for example, equities, debt, currencies, commodities, stocks, bonds, treasuries, futures contracts, derivatives, and/or any suitable trading product. In some embodiments, market index 22 may represent an equities index such as, for example, the Dow Jones Industrial Average, the German DAX, the British FTSE 100, the S&P 500 Total Return Index, and/or other suitable equities index. In other embodiments, market index 22 may represent a commodities index such as, for example, the Dow Jones-AIG Commodity Index, the S&P Commodity Index, and/or other suitable commodities index. In other embodiments, market index 22 may represent a bond index such as, for example, the Dow Jones Corporate Bond Index, the Lehman Aggregate Bond Index, and/or any suitable bond index. In other embodiments, market index 22 may represent one or more currencies such as, for example, the E.U. Euro, the Swiss franc, the British pound, the Japanese yen, and/or suitable combination of currencies and/or currency indices. In yet other embodiments, market index 22 may represent one or more hedge fund indices such as, for example, the HFRI Fund Weighted Composite Index, the CSFB Credit Suisse/Tremont Hedge Fund Index, the FTSE Hedge Index, the Dow Jones Hedge Fund Index, the Eurekahedge Hedge Fund Index, and/or any suitable hedge fund index. Index server 50 is operable to determine the current value of market index 22 based at least in part on market data 32 from exchanges 30.

Index server 50 is operable to determine the current value of master index 44 based at least in part on the determined value of market index 22 and the determined value of SMA index 24. Master index 44 may be configured to represent the performance of full notional exposure to both the total return of market index 22 and SMA index 24. Market index 22 and SMA index 24 may be referred to as component indices of master index 44. In calculating master index 44, index server 50 may proportion market index 22 and SMA index 24 according to a particular weighting scheme. Index server 50 may periodically rebalance the allocation of market index 22 and SMA index 24 such that the notional exposure to the total return of the market index 22 approximately equals the notional exposure to SMA index 24. In some embodiments, the rebalancing is based at least in part on reallocating assumed gains or losses attributed to one component index, accumulated since the last rebalancing, to the other component index.

Index server 50 may calculate the current value of target index 18 based at least in part on the determined value of master index 44. In some embodiments, the current value of target index 18 equals the current value of master index 44 minus index expenses. Index expenses may comprise fees due to exchanges 30 and regulatory services such as, for example, the National Futures Association. Index expenses may further comprise custodial fees for SMAs 64 associated with SMA index 24. In some embodiments, index expenses comprise licensing fees associated with one or more indices.

Figure 5:
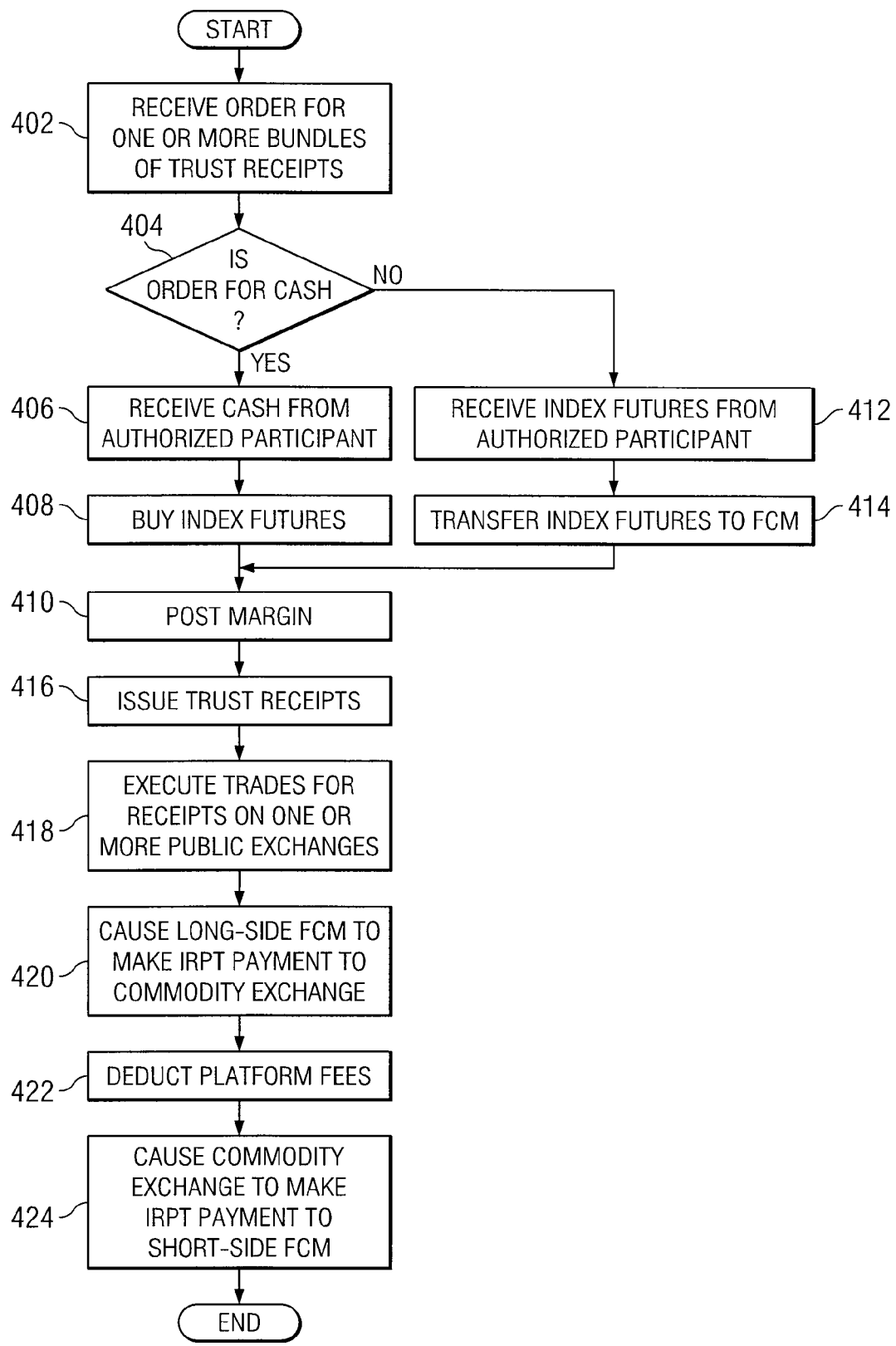
FIG. 5 illustrates a flowchart for managing a trust, according to certain embodiments.

FIG. 5 illustrates a flowchart for managing trust 12, according to certain embodiments. The method begins at step 402 when trust server 40 receives from authorized participant 70 an order for one or more bundles of trust receipts 16. At step 404, trust server 40 determines whether the order is in exchange for only cash 15. If trust server 40 determines at step 404 that the order is in exchange for only cash 15, then at step 406 trust server 40 receives the cash 15 from the authorized participant 70. At step 408, trust server 40 may use the received cash 15 to buy (long) one or more index futures 14 associated with target index 18. In some embodiments, index futures 14 are publicly traded on one or more commodity exchanges 30*b*. The price of index future 14 may be based at least in part on the current value of target index 18.

In conjunction with buying one or more index futures 14, trust server 40 may, at step 410, post margin 56 with FCM 60 associated with trust 12. According to certain requirements, trust 12 associated with trust server 40 may be considered a non-institutional customer 62. Accordingly, trust 12 may be required to post as margin 56 an amount equal to 100% of the value of the purchased index futures 14. To post the appropriate margin 56, trust server 40 may deposit cash 15, short-term debt, securities, and/or other suitable investment instruments in margin account 54 maintained by FCM 60.

If trust server 40 determines at step 404 that the order is in exchange for consideration other than or in addition to cash 15 (e.g., index futures 14), then at step 412 trust server 40 receives index futures 14 (or a combination of index futures 14 and cash 15) from authorized participant 70. At step 414, trust server 40 transfers the received index futures 14 to FCM 60 associated with trust 12. The method then proceeds to step 410 where trust server 40 posts margin 56 with FCM 60 associated with trust 12. At step 416, trust server 40 generates and issues to authorized participant 70 one or more bundles of trust receipts 16 associated with trust 12. At step 418, authorized participants 70, trust 12, and/or investors 28 may buy, sell, and trade trust receipts 16 on one or more public security exchanges 30a. In some embodiments, investing system 10 may repeat one or more of steps 402-418 any suitable number of times prior to executing step 420.

At step 420, investing system 10 may cause long-side FCM 60 associated with trust 12 to make IRPT payment 26 to commodity exchange 30b. According to certain embodiments, long-side FCM 60 may make IRPT payments 26 to commodity exchange 30b periodically and/or independently of the rate at which trades are executed at step 418. At step 422, commodity exchange 30b may deduct platform fees 25 from IRPT payment 26 received from long-side FCM 60. At step 422, commodity exchange 30b may transmit IRPT payment 26 to (1) FCMs 60 holding short positions in index futures 14 on behalf of non-institutional customers 62 and electing institutional customers 58 and (2) institutional customers 58 holding short positions in index futures 14. The method then ends.

Although the present invention has been described in detail, it should be understood that various changes, substitutions, and alterations can be made hereto without departing from the scope of the invention as defined by the appended claims.

What is claimed is:

1. A system, comprising:
   a memory operable to store market data; and
   a processor communicatively coupled to the memory and operable to:
      buy a plurality of index futures, wherein:
         the plurality of index futures are held as long positions in a trust; and
         a particular index future is publicly traded on a commodity exchange;
      issue a plurality of trust receipts associated with the trust, wherein the plurality of trust receipts are publicly traded on at least one security exchange; and
      post a margin with a first futures commission merchant (FCM) associated with the trust, wherein:
         the margin is based at least in part on the plurality of index futures; and
         the first FCM makes a first interest payment to the commodity exchange, the first interest payment associated with the plurality of index futures; and
         based at least in part on the first interest payment, the commodity exchange transmits a second interest payment to a second FCM associated with an investor that holds one or more short positions in index futures.

2. The system of claim 1, wherein:
   the commodity exchange deducts platform fees from the first interest payment; and
   the deducted platform fees are usable to pay at least one expense of the trust.

3. The system of claim 2, wherein the trust comprises a variable interest trust.

4. The system of claim 2, wherein the platform fees comprise at least one of the following:
   licensing fees payable to at least one index provider;
   custodial fees associated with at least one separately managed account (SMA);
   listing fees payable to the commodity exchange; and
   development fees payable to at least one developer of the index futures.

5. The system of claim 1, wherein:
   a particular index future represents a futures contract on a particular index; and
   the particular index is based at least in part on a market index and an index of separately managed accounts.

6. The system of claim 5, wherein the market index is the Dow Jones-AIG Commodity Index.

7. The system of claim 5, wherein the particular index represents full notional exposure to the market index and the index of separately managed accounts.

8. The system of claim 1, wherein:
   a particular index future represents a PIMCO CommodityRealReturn DJ-AIGCI TRACKR.

9. The system of claim 1, wherein:
   a particular index future represents a futures contract on a particular index; and
   the particular index is the PIMCO CommodityRealReturn DJ-AIGCI TRAKRS Index.

10. The system of claim 1, wherein:
    the trust represents a commodity pool; and
    all net assets of the trust are invested in long positions in index futures.

11. The system of claim 1, wherein:
    the plurality of index futures are bought for a market value; and
    posting a margin comprises depositing in a margin account an amount of cash that is equal to the market value.

12. The system of claim 1, wherein a particular trust receipt represents a fractional undivided beneficial interest in net assets of the trust.

13. The system of claim 1, wherein:
    the trust is a non-institutional customer of the commodity exchange;
    the trust is subject to a margin requirement of 100% of a market value of index futures; and
    an institutional customer of the commodity exchange is subject to a margin requirement of 5%-10% of a market value of index futures.

14. A method, comprising:
    electronically buying a plurality of index futures using a processor, wherein:
       the plurality of index futures are held as long positions in a trust; and
       a particular index future is publicly traded on a commodity exchange;
    electronically issuing a plurality of trust receipts associated with the trust using the processor, wherein the plurality of trust receipts are publicly traded on at least one security exchange; and
    electronically posting a margin with a first futures commission merchant (FCM) associated with the trust using the processor, wherein:
       the margin is based at least in part on the plurality of index futures;
       the first FCM makes a first interest payment to the commodity exchange, the first interest payment associated with the plurality of index futures; and
       based at least in part on the first interest payment, the commodity exchange transmits a second interest payment to a second FCM associated with an investor that holds one or more short positions in index futures.

15. The method of claim 14, wherein:
the commodity exchange electronically deducts platform fees from the first interest payment using a processor; and
the deducted platform fees are usable to pay at least one expense of the trust.

16. The method of claim 15, wherein the trust comprises a variable interest trust.

17. The method of claim 15, wherein the platform fees comprise at least one of the following:
licensing fees payable to at least one index provider;
custodial fees associated with at least one separately managed account (SMA);
listing fees payable to the commodity exchange; and
development fees payable to at least one developer of the index futures.

18. The method of claim 14, wherein:
a particular index future represents a futures contract on a particular index; and
the particular index is based at least in part on a market index and an index of separately managed accounts.

19. The method of claim 18, wherein the market index is the Dow Jones-AIG Commodity Index.

20. The method of claim 18, wherein the particular index represents full notional exposure to the market index and the index of separately managed accounts.

21. The method of claim 14, wherein:
a particular index future represents a PIMCO CommodityRealReturn DJ-AIGCI TRACKR.

22. The method of claim 14, wherein:
a particular index future represents a futures contract on a particular index; and
the particular index is the PIMCO CommodityRealReturn DJ-AIGCI TRAKRS Index.

23. The method of claim 14, wherein:
the trust represents a commodity pool; and
all net assets of the trust are invested in long positions in index futures.

24. The method of claim 14, wherein:
the plurality of index futures are bought for a market value; and
posting a margin comprises depositing in a margin account an amount of cash that is equal to the market value.

25. The method of claim 14, wherein a particular trust receipt represents a fractional undivided beneficial interest in net assets of the trust.

26. The method of claim 14, wherein:
the trust is a non-institutional customer of the commodity exchange;
the trust is subject to a margin requirement of 100% of a market value of index futures; and
an institutional customer of the commodity exchange is subject to a margin requirement of 5%-10% of a market value of index futures.

* * * * *